US009219720B1

(12) United States Patent
Satpathy et al.

(10) Patent No.: US 9,219,720 B1
(45) Date of Patent: Dec. 22, 2015

(54) METHOD AND SYSTEM FOR AUTHENTICATING A USER USING MEDIA OBJECTS

(71) Applicants: Lalatendu Satpathy, San Jose, CA (US); Deborah Krawczak Galdes, Los Altos, CA (US); Thomas E. Hurlbutt, Mountain View, CA (US)

(72) Inventors: Lalatendu Satpathy, San Jose, CA (US); Deborah Krawczak Galdes, Los Altos, CA (US); Thomas E. Hurlbutt, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 281 days.

(21) Appl. No.: 13/707,345

(22) Filed: Dec. 6, 2012

(51) Int. Cl.
*G06F 21/00* (2013.01)
*G06F 7/04* (2006.01)
*H04L 29/06* (2006.01)
*G06F 21/62* (2013.01)

(52) U.S. Cl.
CPC ............ *H04L 63/08* (2013.01); *G06F 21/6218* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 7,292,680 B1 | 11/2007 | Simpson | |
| 7,292,723 B2 | 11/2007 | Tedesco et al. | |
| 7,827,204 B2 | 11/2010 | Heinzel et al. | |
| 8,020,763 B1* | 9/2011 | Kowalchyk et al. | 235/380 |
| 2002/0046335 A1* | 4/2002 | Baum-Waidner | 713/156 |
| 2003/0200272 A1* | 10/2003 | Campise et al. | 709/206 |
| 2004/0030934 A1 | 2/2004 | Mizoguchi et al. | |
| 2004/0230843 A1 | 11/2004 | Jansen | |
| 2005/0134427 A1 | 6/2005 | Hekimian | |
| 2005/0216953 A1* | 9/2005 | Ellingson | 726/6 |
| 2006/0282660 A1* | 12/2006 | Varghese et al. | 713/155 |
| 2007/0067295 A1 | 3/2007 | Parulski et al. | |
| 2007/0074119 A1 | 3/2007 | Komine et al. | |
| 2007/0094717 A1 | 4/2007 | Srinivasan et al. | |
| 2007/0266428 A1 | 11/2007 | Downes et al. | |
| 2007/0277224 A1 | 11/2007 | Osborn et al. | |
| 2008/0028453 A1* | 1/2008 | Nguyen et al. | 726/9 |
| 2008/0034209 A1* | 2/2008 | Dickinson et al. | 713/168 |
| 2008/0046968 A1 | 2/2008 | Cline et al. | |
| 2008/0066165 A1* | 3/2008 | Rosenoer | 726/5 |
| 2008/0104065 A1 | 5/2008 | Agarwal et al. | |
| 2008/0134297 A1* | 6/2008 | Clinick et al. | 726/4 |
| 2008/0141339 A1* | 6/2008 | Gomez et al. | 726/1 |
| 2008/0222710 A1 | 9/2008 | Blagsvedt et al. | |
| 2008/0244700 A1* | 10/2008 | Osborn et al. | 726/2 |
| 2009/0112649 A1* | 4/2009 | Wernikoff | 705/7 |
| 2009/0199264 A1* | 8/2009 | Lang | 726/1 |
| 2011/0209200 A2* | 8/2011 | Mr. White et al. | 726/4 |

OTHER PUBLICATIONS

Bailey, K., Curran, K, Condell, J., "Evaluation of Pixel-Based Steganography and Stegodetection Methods" Imaging Science Journal, vol. 52, No. 3, pp. 131-150, Jan. 2004.
Horiuchi, T., "Automatic Seal Verification by Evaluating Positive Cost," Fac. of Software & Inf. Sci., Iwate Prefectural University, Japan, 572-6, Sep. 10-13, 2001.

* cited by examiner

*Primary Examiner* — Abu Sholeman
*Assistant Examiner* — Maung Lwin
(74) *Attorney, Agent, or Firm* — Osha • Liang LLP

(57) ABSTRACT

A method for authenticating a user includes receiving an account identifier from the user, obtaining, based on the account identifier, a valid media objects, and presenting, to the user, media objects that include valid media objects and a invalid media objects. A selection of a subset of the media objects is received. The method further includes obtaining user metrics for risk analysis, performing, by a computer processor, risk analysis to identify a risk level based on user metrics, authenticating, based on the risk level and the selection of the subset, the user, and authorizing the user to access a resource when the user is authenticated.

24 Claims, 8 Drawing Sheets

METHOD AND SYSTEM FOR AUTHENTICATING A USER USING MEDIA OBJECTS

SUMMARY

In general, in one aspect, the invention relates to a method for authenticating a user. The method includes receiving an account identifier from the user, obtaining, based on the account identifier, valid media objects, and presenting, to the user, media objects that include valid media objects and a invalid media objects. A selection of a subset of the media objects is received. The method further includes obtaining user metrics for risk analysis, performing, by a computer processor, risk analysis to identify a risk level based on user metrics, authenticating, based on the risk level and the selection of the subset, the user, and authorizing the user to access a resource when the user is authenticated.

In general, in one aspect, the invention relates to a system for authenticating a user that includes a computer processor, a data repository, and an authentication engine. The data repository is for storing an account that includes valid media object identifiers. The authentication engine is connected to the data repository, executes on the computer processor, and includes a risk analysis module and an authentication module. The risk analysis module is configured to obtain user metrics for risk analysis, and perform risk analysis to identify a risk level based on the user metrics. The authentication module is configured to receive, from a user, an account identifier identifying the account, obtain, based on the account identifier, valid media objects identified by the valid media object identifiers, and present, to the user, media objects that include valid media objects and invalid media objects. The authentication module is further configured to receive, from the user, a selection of a subset of the media objects, authenticate, based on the risk level and the selection of the subset, the user, and authorize the user to access a resource when the user is authenticated.

In general, in one aspect, the invention relates to a non-transitory computer readable medium comprising computer readable program code for authenticating a user. The computer readable program code is for receiving an account identifier from the user, obtaining, based on the account identifier, valid media objects, presenting, to the user, media objects that include valid media objects and invalid media objects, and receiving, from the user, a selection of a subset of the media objects. The computer readable program code is further for obtaining user metrics for risk analysis, performing risk analysis to identify a risk level based on user metrics, authenticating, based on the risk level and the selection of the subset, the user, and authorizing the user to access a resource when the user is authenticated.

Other aspects of the invention will be apparent from the following description and the appended claims.

DETAILED DESCRIPTION

Figure 1:
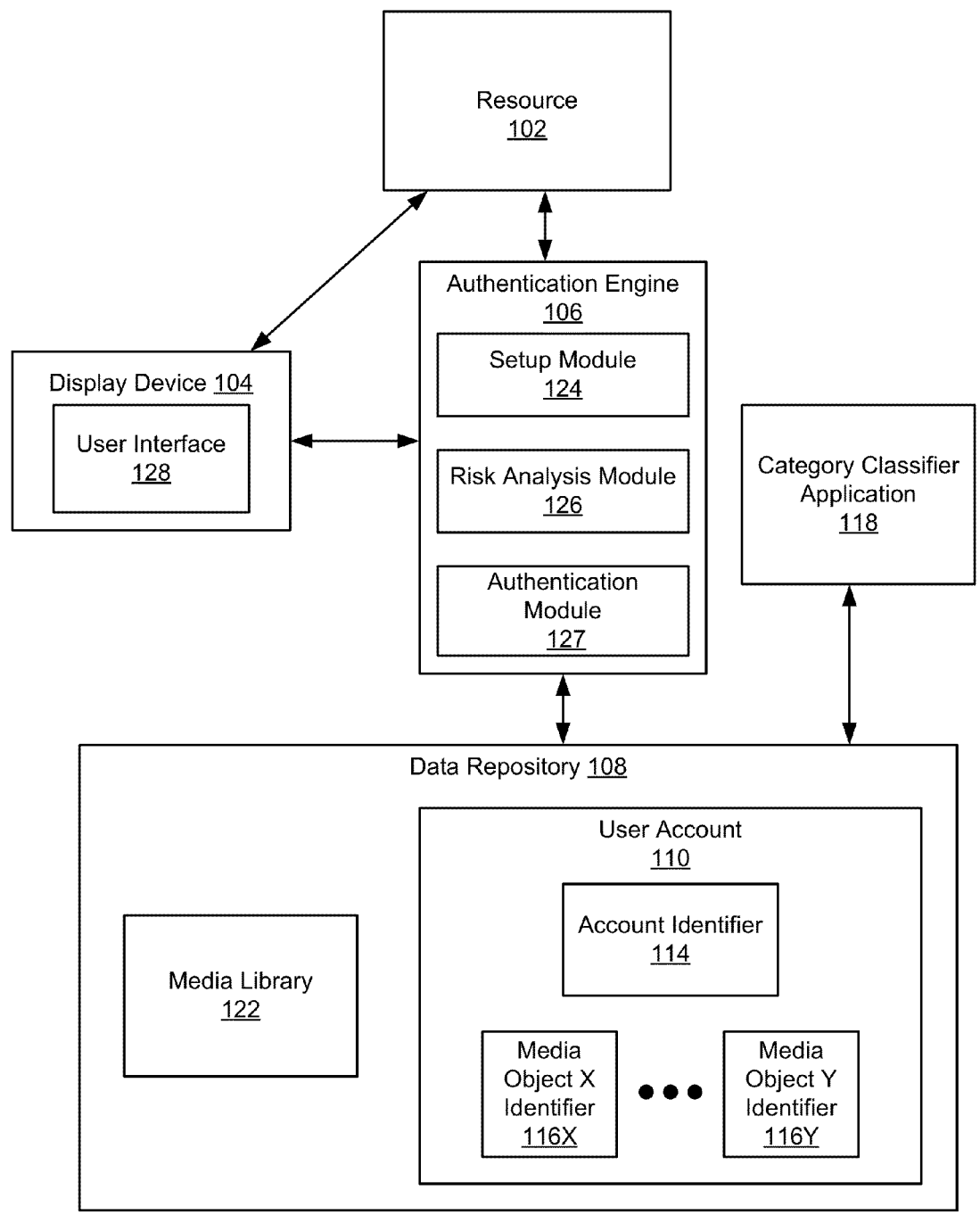
FIG. 1 shows a schematic diagram of a system in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for authenticating a user. Specifically, embodiments of the invention grant access to a resource based on a user selecting media objects and based on risk analysis. The media objects, from which the user selects a subset, include valid media objects intermixed in a set of invalid media objects. The risk analysis is performed based on user metrics and defines a risk level. Based on the risk level, the user is authenticated depending on whether the user's selection of the subset is sufficient.

FIG. 1 shows a schematic diagram of a system in one or more embodiments of the invention. As shown in FIG. 1, the system has several components including a resource (102), an authentication engine (106), a display device (104), and a data repository (128) in one or more embodiments of the invention. Each of these components is described below.

In one or more embodiments of the invention, a resource (102) is any securable physical or virtual object. Specifically, the resource (102) is the object to be protected so that only the appropriate individual(s) can access the resource. For example, the resource (102) may be a file, an application, a web site, a hardware device, a physical facility, a safe, a room, a physical filing cabinet, a financial account, a computer storage account, an account accessible by a kiosk, a home security system, a telephone, and/or anything else that needs to be secure and, therefore, requires user authentication. Example applications include financial software (e.g., accounting software, tax preparation software, payroll software, banking software), medical provider software, insurance claim software, home inventory software, productivity software, document management software, e-commerce software, and/or other software requiring authentication.

In one or more embodiments of the invention, the data repository (108) is any type of storage unit and/or device (e.g., a file system, database, collection of tables, or any other storage mechanism) for storing data. Further, the data repository (108) may include multiple different storage units and/or devices. The multiple different storage units and/or devices may or may not be of the same type or located at the same physical site. In one or more embodiments of the invention, the data repository (108) stores one or more user accounts (110) and a media library (122). Both of these components are discussed below.

In one or more embodiments of the invention, the media library (122) includes stock media objects in accordance with one or more embodiments of the invention. A stock media object is generic, predefined, and/or default media that are available to be used as a media object for the user to authenticate to an account. Specifically, the stock media is not specific to the account owner of the account. Rather the stock media may be used and associated with multiple different accounts.

In one or more embodiments, the media found in the media object is primarily non-textual or purely pictorial. For example, the media may be an image, a group of images that together form a story, a video, a sound clip (e.g., music, a song, and a sound of an event), or a collection of media components. If the media is an image, then the image may be a photograph generated by a digital camera, a scanned photograph, a photograph from a web site, a drawing, a motion picture frame, a document page, a slide from a slide show, word art, a map, a map with another image superimposed on the map, or any other such image. Those skilled in the art will appreciate that media corresponding to images or video may include text. Further, in one or more embodiments of the invention, the media may exist in any accessible file format. The stock media object may be provided by a third party.

In one or more embodiments of the invention, the media objects may be associated with one or more tags. The tags may be used for categorizing the media (discussed below). Specifically, each tag may be a single attribute associated with the media. For example, each tag may describe content presented within the media (e.g., family members, vacation destinations, pets, schools, landmarks, cars, athletes, celebrities, political figures, etc.). In one or more embodiments of the invention, the one or more tags associated with a media are embedded as metadata within the media objects. Alternatively or additionally, the one or more tags may be related in storage with the media objects rather than embedded as metadata.

In one or more embodiments of the invention, each stock media object has an assigned category. In other words, the stock media objects may be grouped into categories. The stock media may be categorized by themes, types, subjects, and any other distinguishing characteristic that may be categorized. The distinguishing characteristic of the stock media may be atomically determined by the category classifier application (118) (discussed below) or manually determined by a third party. Further, the distinguishing characteristic of the stock media defines the category of the stock media sharing the characteristic. The category may be grouped and labeled by the category classifier application (118) according to the distinguishing characteristic. For example, the distinguishing characteristic of the stock media for a given group may be interpreted as winter sports. Therefore, the group may be labeled as the "winter sports" category.

Continuing with FIG. 1 and, specifically, the data repository (108), a user account (110) provides credentials for an account owner. The account owner may be a specific individual or a group (e.g., a company, organization, or other such group). The user account (110) includes information for detecting whether a user is the specific individual, a member of the group that is authorized to access the resource, or a malicious individual or computer attempting to gain access to the resource. Specifically, a user, as used herein, is one or more individuals using the system. For example, the user performing the authentication process may be the same or different from the user that performed any setup operations. The user performing the authentication process may or may not be authorized by the user performing the setup operations. Further, as used herein, the user performs actions when the actions are performed on behalf of the user.

In one or more embodiments of the invention, the account may be dedicated to the function of authenticating the user. In particular, the user account (110) may be an access account that includes only data for authentication. Alternatively, the user account (110) may include the resource (102) that the user is attempting to access. For example, if the resource (102) is the account owner's privileged data (e.g., financial data, personal information, or other such data), then the privileged data may be stored with the data for authentication.

In one or more embodiments of the invention, a single account owner may have multiple user accounts (110) in accordance with one or more embodiments of the invention. Each of the multiple user accounts (110) may pertain to a different resource (102). Those skilled in the art, having the benefit of this detailed description, will appreciate that the requirements for authenticating a user may differ among resources. In other words, some resources may have very strict authentication requirements, with multiple levels of authentication, while other resources may have more lenient authentication requirements, with only a single level of authentication. Accordingly, in one or more embodiments of the invention, each account may include the authentication requirements of the resource to which the account pertains.

In one or more embodiments of the invention, a user account (110) includes data, such as an account identifier (114) and a media object identifier (e.g., media object X identifier (116X), media object Y identifier (116Y)) The account identifier (114) is an identifier for the user account (110) that may be used by the user to specify which account includes the credentials for authentication. Thus, the account identifier (114) may be a series of symbols, numbers, and/or letters that identify the user account (110). For example, the account identifier (114) may be an email address of the account owner, a social security number, a login name, or any other type of meaningful identifier.

In one or more embodiments of the invention, the media object identifier (e.g., media object identifier X (116X), media object identifier Y (116Y)) is an identifier of valid media objects. Specifically, the media object identifier is a reference to media objects that are valid for authenticating a user to the user account. For example, the media object identifier may be a number, a file name, a name, an alphanumeric string, a file path, or any other identifier that uniquely identifies which media objects in the media library (122) is valid for authenticating the user. Alternatively, although FIG. 1 shows the user account as referencing the stock media, a copy of valid media objects may be stored in the user's account. In such a scenario, the media object identifier may not exist or may be metadata in the copy of the media object.

In one or more embodiments of the invention, valid media objects are media objects that are preselected (i.e., selected prior to the authentication attempt) as being correct for authenticating the user. In other words, the valid media objects are at least a part of the authentication credentials. In one or more embodiments of the invention, the user selects which media objects become valid media objects as part of a setup procedure (discussed below and in FIG. 2). When the user selects a valid media object during an authentication procedure, the selection is deemed correct based on the media object identifier being in the user account.

In contrast, in one or more embodiments of the invention, invalid media objects are media objects that obfuscate the valid media objects. For example, invalid media objects may be selected, by the system, as part of the authentication procedure. When a user selects an invalid media object, the selection of the invalid media object is incorrect or an error on the part of the user. In other words, invalid media objects do not assist the user in being authenticated. In other words, the invalid media objects are not part of the authentication credentials. However, in one or more embodiments of the invention, the user may still be authenticated even with selecting one or more invalid media objects, provided that the user selected a minimum number of valid media objects, whereby the minimum number is set by risk analysis (discussed below).

Continuing with FIG. 1, in one or more embodiments, a category classifier application (118) includes functionality to categorize the stock media objects in the media library (122). The category classifier application (118) includes functionality to categorize stock media according to the subject matter of the stock media. The category classifier application (118) may be a separate application or may be a part of the authentication engine (106) discussed below.

Continuing with FIG. 1, an authentication engine (106) includes functionality to control access to the resource (102) in one or more embodiments of the invention. Specifically, the authentication engine (106) includes functionality to obtain the media object (116) for presentation to the user. The authentication engine (106) further includes functionality to receive and compare the media object (116) to authenticate the user. The authentication technique provided by the authentication engine (106) may be based on the authentication requirements of the resource (102). In one or more embodiments of the invention, the authentication engine (106) includes a setup module (124), a risk analysis module (126), and an authentication module (127). Each of these components is described below.

In one or more embodiments of the invention, the setup module (124) includes functionality to identify the valid media object for authentication. For example, the setup module may include functionality to acquire user credentials during a user account (110) creation process for authentication. The user creates the account to access a resource and the user credentials are included as authentication requirements for the resource. Additionally or alternatively, the setup module includes functionality to request a category selection from a group of categories and a media object selection thereafter. Additionally or alternatively, the categories may be assigned to the user and the user selects the media objects for the pre-assigned categories. The selection of both the category and media object by the user provides user credentials to authenticate the user of the user account (110). Additional categories and media objects may be selected by the user depending on the level of authentication requirements of the resource. Further, the authentication requirements of the resource may be regulated by risk analysis (discussed below).

In one or more embodiments of the invention, the risk analysis module (126) includes functionality to determine the risk level and authentication requirements for accessing a resource. A risk level is an identifier of a level of risk on a scale. For example, the scale may be from high risk to low risk. The risk level may be high risk, medium risk, low risk, or risk levels above or between high, medium, and low. By way of another example, the scale may be numeric (e.g. from one to ten) and the risk level may be a numeric value on the scale. Alternatively, the scale may be alpha or alphanumeric (e.g. from A to Z or A-1 to Z-10) and the risk level may be an alpha or alphanumeric value on the scale.

The risk analysis module (126) may include functionality to gather metrics to identify the risk level. The metrics may include user metrics to verify the user's identity. The metrics may include, for example, attributes of the user's given context (i.e., previously recorded user behavior) (e.g., device used, IP address, geolocation, device identifiers from previous interactions with system, date/time), information about the device attempting authentication, and/or historical information gathers/saved regarding the user's and/or device's previous interactions with the system. For example, the user metrics may include the user's Internet Protocol (IP) address, device artifacts (e.g., cookies, storage objects in the cache, storage objects in the local storage device, a flash object, etc.), geolocation, number of login attempts, and any other metrics to verify the user as the account owner. For example, verifying the user's identity may require checking the IP address and cookies of the user, if any, to ensure a secure verification. Moreover, if the IP address is from a different country, the risk analysis may set the risk level to high. If the IP address was previously recorded, the risk analysis module may set the risk level on low.

The authentication module (127) includes functionality to receive the selection of the media objects from the user, obtain the risk level from the risk analysis module, and authenticate the user based on the risk level. The authentication module (127) further include functionality to permit access to the resource when the user is authenticated. For example, based on the risk level, the authentication module (127) may increase the user's media recognition requirement to gain access to the resource. As mention above, different level of risks may be evaluated from the acquired metrics (e.g., high, medium, low). Further, the user may be required to select additional media objects depending on the risk level determined by the risk analysis module. For example, in the event of high risk, the user may be required to recognize four images correctly and in a low risk situation the user may be required to recognize the only three out of four images correctly.

In one or more embodiments of the invention, the authentication engine (106) is operatively connected to a user interface (128). The user interface (128) includes functionality to interact with the user. Specifically, the user interface (128) includes functionality to present the categories and media objects. The user interface (128) may include a web page, an authentication window, a pop-up box, or any other type of component for authenticating a user. The user interface (128) may also include functionality to allow the user to interact with the resource (102).

In one or more embodiments of the invention, the user interface (128) is displayed on a display device (104). The display device (104) may be a display of a computing device. Specifically, a computing device is a device that includes functionality to process instructions. For example, the display device (104) may be a kiosk, a computer system, a home security system, a server, mainframe, desktop personal computer (PC), laptop, personal digital assistant (PDA), television, cable box, satellite box, telephone, mobile phone, and/or any other type of computing device.

In one or more embodiments of the invention, the display device (104) is a physical system to display the user interface (128). One skilled in the art will appreciate that different configurations of the system may be used. For example, components of the system or a portion of the components may be located on the same device (e.g., a server, mainframe, desktop personal computer (PC), laptop, personal digital assistant (PDA), television, cable box, satellite box, kiosk, telephone, mobile phone, etc.) or may be located on separate devices connected by a network (e.g., the Internet), with wired and/or wireless segments. Below are only a few examples of the different configurations for presenting the user interface (128).

In a first example, the user interface (128) may be connected to the authentication engine (106) and/or the resource (102) via a network (not shown). For example, the authentication engine (106) may be on a server that is separate from the computing device on which the user interface (128) executes. Similarly, the resource (e.g., an online account) may be local to the computing device on which the user interface (128) executes. In such example, the user interface (128) may be a web page shown on a local computing device of the user that is provided by the authentication engine (106). Once the user is authenticated, the user interface may require a token, cookie or other code to access the online account. Alternatively, the authentication engine (106), in the example, may be interposed between the resource (102) and the user interface (128). At each interaction with the resource (102), the authentication engine (106) may perform a check to determine whether the user is authenticated.

In another example, the user interface (128) may exist on the resource (102) with the authentication engine (106). Specifically, the resource (102) may be the computing device on which the authentication engine executes. For example, in the scenario in which the resource is a security system or cable box, the user interface (128) may be displayed on a screen of the resource. The authentication engine (106) may also execute on the resource or may have a client that executes on the resource. In the example, the authentication may allow the user to change the settings of the resource (e.g., disarm the alarm, adjust parental controls, order movies, and other such settings).

In another example, the user interface (128) and the authentication engine (106) may exist on the same computing device that is separate from the resource (102). For example, the resource (102) may be a physical filing cabinet, an entire physical building, or a room within the building. In the example, the computing device on which the user interface (128) and the authentication engine (106) executes may be an electronic lock for the resource (102).

As shown above, by way of example, the components of the system for presenting the user interface (128) may exist in virtually any configuration. The configuration that is used may be based on the type of resource (102) and/or the desired level of authentication.

Although FIG. 1 shows the display device (104) as having the user interface (128), the user interface (128) may be a component of the authentication engine (106). For example, the authentication engine (106) may be a web application that transmits instructions for the user interface (128) to the computing system (not shown) that has the display device (104).

Further, as discussed above, although FIG. 1 shows a certain configuration of components, other configurations may be used without departing from the scope of the invention. For example, the functionality of one or more components may be combined into a single component, and/or all or part of the functionality of a single component may be performed by a different and/or new component. Further, connections between the various components of FIG. 1 may direct or indirect. For example, components may be located on the same hardware device. By way of another example, hardware devices having the components may be connected via direct or indirect via wired and/or wireless connections, such as via a network. Further, the connections between two components may be different then the connection between two different components of FIG. 1. For example, the authentication engine may execute on the same server that stores the data repository and the authentication engine may be connected to the display device via a network.

Figure 2:
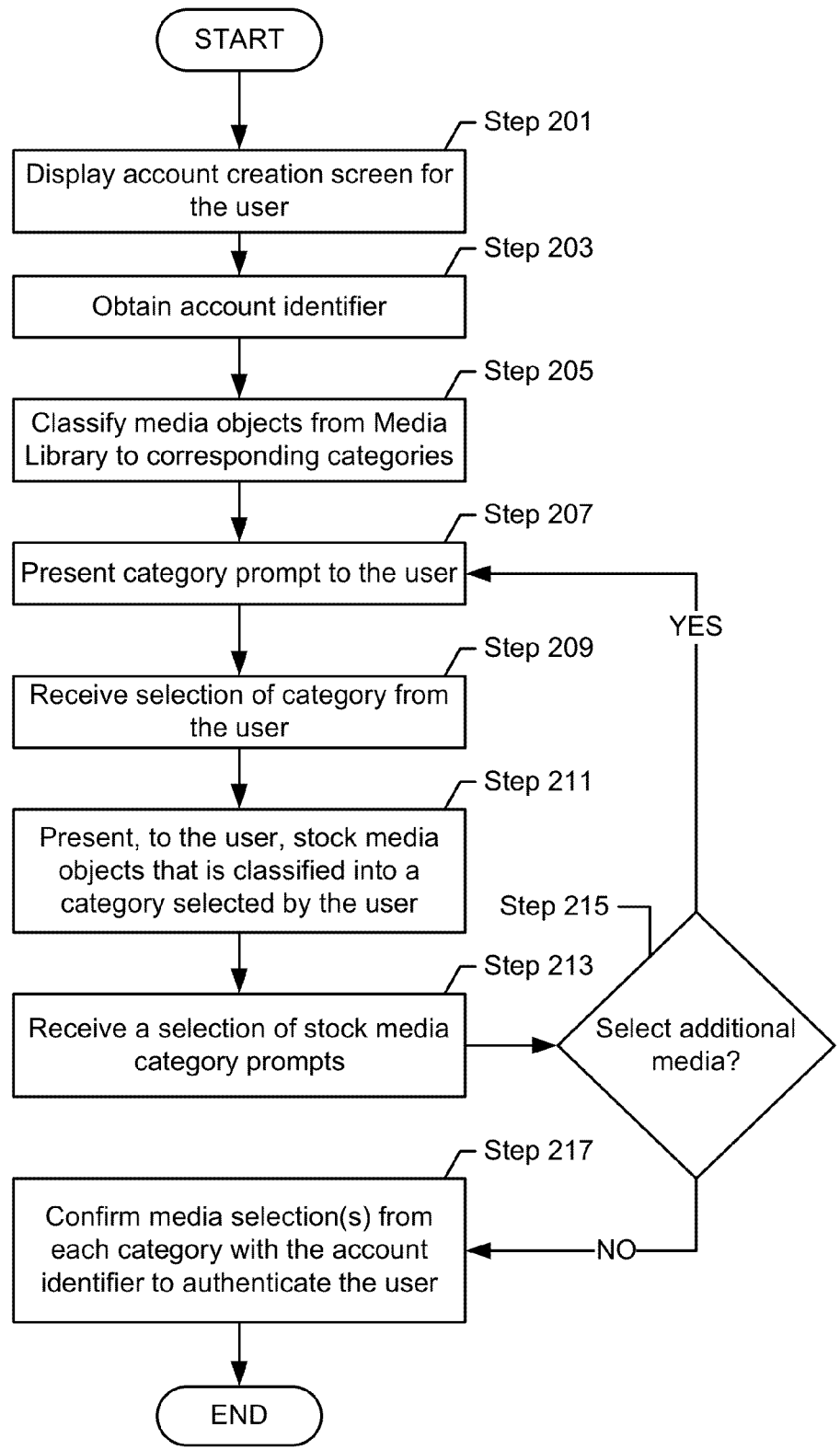
FIGS. 2 and 3 show flowcharts in one or more embodiments of the invention.
Figure 3:
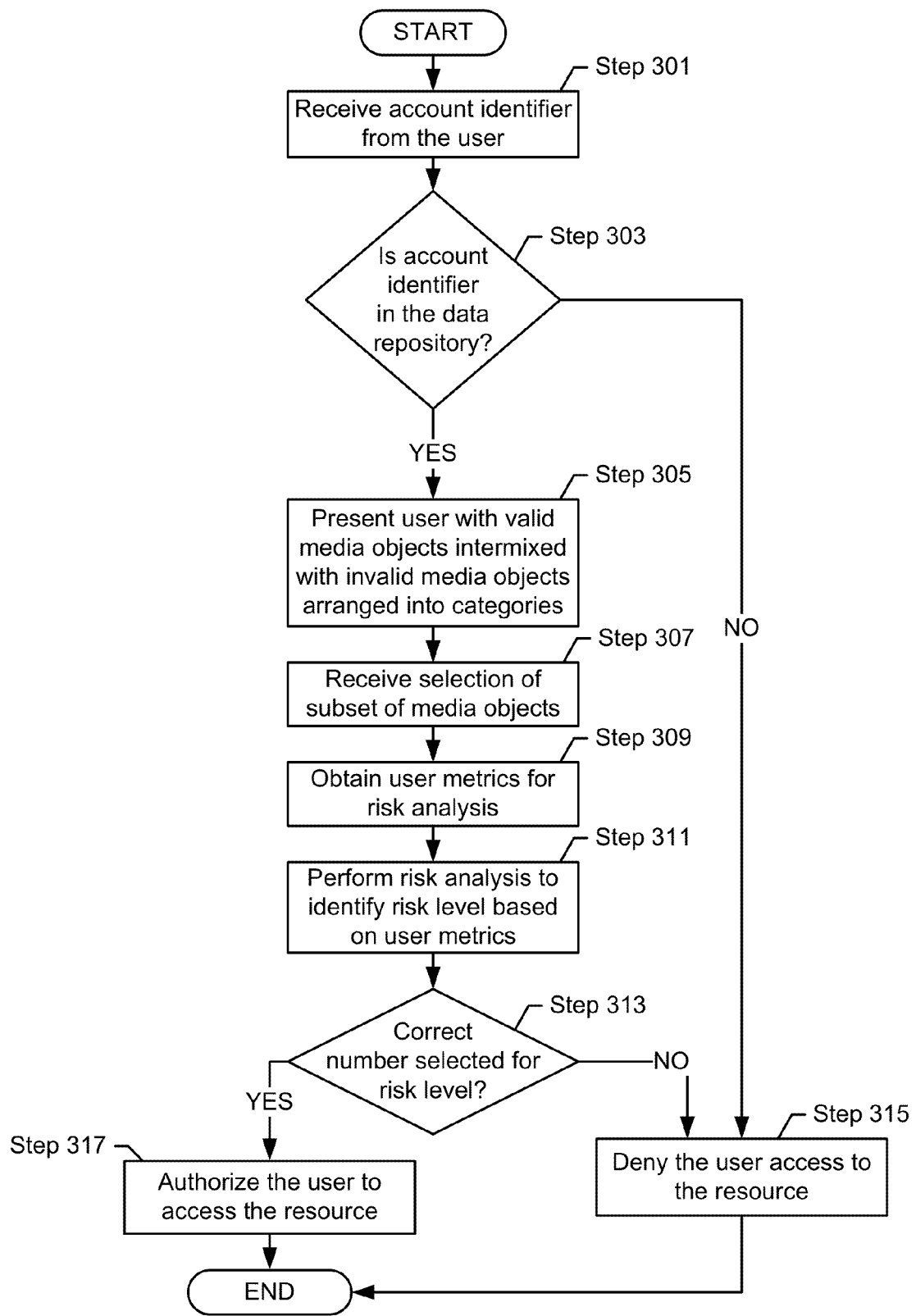

FIGS. 2-3 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Further, steps such as determination steps may or may not require an actual operation to be performed. In addition, steps such as store and communication acknowledgements have been omitted to simplify the presentation.

FIG. 2 shows a flowchart for creating an account in accordance with one or more embodiments of the invention. Initially, an account creation screen is displayed for the user (Step 201). In one or more embodiments of the invention, the account creation screen allows the user to create a new account. The account creation screen may include various fields specific to creating an account for a particular resource or group of resources.

In one or more embodiments of the invention, an account identifier is obtained in accordance with one or more embodiments of the invention (Step 203). The user may submit the account identifier using the account creation screen. For example, the user may submit a preexisting identifier or a desired identifier. If the user submits a desired identifier, then a check may be performed to determine whether the desired identifier already exists. Alternatively, the account identifier may be assigned to the account owner. For example, the account identifier may be pre-assigned by an entity controlling the resource.

In one or more embodiments of the invention, media objects in the media library are classified into categories (Step 205). The classification may occur before and/or during the account creation. In one or more embodiments of the invention, classifying the media objects may be performed manually or automatically. For example, an individual may review the media objects and select a category for the media objects based on the review. As another example, image, video, and/or sound recognition software may scan the media object and automatically classify the media objects. As another example, the classification may be based on metadata or tags associated with the media objects.

After the media objects are classified to corresponding categories, the categories are presented to the user (Step 207). For example, the user may be presented with a drop down box, a series of buttons, or another user interface components that may present possible categories the user. Alternatively or additionally, the user may be presented with an input field, from which the user may submit a search for the category.

In one or more embodiments of the invention, a selection of the category is received (Step 209). The account owner may select the category, for example, by selecting a name of the category, a thumbnail for the category, a button associated with the category, or performing any other action for specifying a category prompt.

In one or more embodiments of the invention, stock media objects are presented to the user (Step 211). Specifically, the stock media objects are obtained from the media library and presented to the user. The stock media that are images may be presented as a thumbnail or the full image. The stock media objects that are video or sound clip may be presented in a manner such that the user may play the stock media. Alternatively or additionally, the stock media may be initially presented as a name of the stock media from which the user may select the name to view a presentation of the stock media.

In one or more embodiments of the invention, a selection of the stock media object is received (Step 213). The user may select the stock media object, for example, by selecting a name of the stock media object, a thumbnail for the stock media object, a button associated with the stock media object, or performing any other action for specifying a virtual object. The selected media object is stored with the account identifier to authenticate the user. Specifically, the user account is updated to reflect that the stock media object is a valid media object. In one or more embodiments of the invention, a media object identifier for the stock media object is stored in the user account.

Further, a determination is made whether to select additional media (Step 215). The number of valid media objects may be dependent on the resource. For example, a resource may use strict authentication requirements and additional media would be required to access the resource. Additionally, the additional media may be necessary appease high risk determined by the risk analysis module. If the user selects additional media, then the category prompt is presented as described in Step 207 and continues the flowchart accordingly. If no additional media is selected, then the authentication engine confirms the media selection(s) from each category with the account identifier to authenticate the user (Step 217). For example, the valid media objects that the user selected in Step 213 may be presented to the user with a user interface component to confirm the selection. Based on the confirmation, the valid media objects may be associated with or remain associated with the user account.

Although FIG. 2 shows an iterative flow, whereby the user selects the category and then the stock media objects from the category before selecting the next category, the user may select multiple categories and then select the media objects.

FIG. 3 shows a flowchart of a method for authentication in accordance with one or more embodiments of the invention. The authentication procedure described below may be used each time the user wants to log onto the resource or only when the user forgets a login password. For example, when presented with a user identifier and password link, the user may select a link indicating a forgotten password request. The method discussed below may allow the user to retrieve the user's password after receiving the forgotten password request. In the description below, the user may be the account owner, an individual permitted by the account owner to access the resource, a malicious individual, a malicious computer, or any other person or computing device.

Initially, an account identifier is received from the user (Step 301). The account identifier may be received, for example, using any technique known in the art. In one or more embodiments of the invention, an account identifier may be stored or associated with the computer device of the user. For example, when the user is previously authenticated, a cookie, or other such device may be stored on the user's computer device. The cookie may be associated with the account identifier. Thus, the cookie can be detected so that the user does not need to provide an account identifier. In one or more embodiments of the invention, the account identifier may be obtained based on recognition of the user's computing device. For example, the account identifier may be obtained by reading the caller identifier, obtaining a serial number (e.g., associated with the computing device), obtaining an internet protocol (IP) address, or obtaining any other identifying property or information that can reasonably be attributed to a specific user. Regardless of how the account identifier is obtained, the data repository may be accessed using the account identifier.

Next, a determination is made whether the account identifier is in the data repository (Step 303) in accordance with one or more embodiments of the invention. Specifically, a query specifying the account identifier and requesting the media object identifier may be submitted to the data repository. In one or more embodiments of the invention, if no results are obtained from the query, then the determination is made that the account identifier is not in the data repository. In such a scenario, the user is denied access to the resource (Step 315). Rather than denying complete access to the resource, the user may be prompted to resubmit the account identifier. In other words, the user may be granted another opportunity to submit a correct account identifier. Alternatively or additionally, when access to the resource is denied, the user may be presented with entirely invalid sets of media objects and categories. In such a scenario, no matter the selection, the user is not able to access the resource. In other words, the system may obfuscate that the user is denied access to the resource based on a false account identifier. Before denying access to the resource, the user may be asked whether the user wants to create a new account. If the user wants to create a new account, then the method may proceed as shown and described in association with FIG. 2.

Alternatively, if the account identifier is in the data repository, then the media object(s) are presented to the user (Step 305). In one or more embodiments of the invention, valid media objects are presented intermixed with invalid media objects arranged into categories. Specifically, the media object is intermixed with the invalid media objects and invalid media may be used to obfuscate which media combination is used to authenticate a user. More specifically, the valid media object may be placed in a random position with respect to the invalid media objects. In one or more embodiments of the invention, the invalid media objects are of the same type as the media object. For example, if the media object is an image, then the invalid media objects are also images. If the media object is an image, then the image may be displayed to the user. If the media object is a video or sound clip, then the media object may be played for the user. For example, the user may select a button to play the sound clip or video.

Moreover, the authentication engine receives a subset of media objects (Step 307) selected by the user. Specifically, the user selects one or more media object from the media objects presented as described in Step 305. The selection is compared with the valid media object, which is obtained during account creation described in FIG. 2.

Continuing with FIG. 3, in one or more embodiments of the invention, the authentication engine obtains metrics for risk analysis (Step 309). Specifically, the risk analysis module may obtain the metrics according to the requirements set by a resource. Obtaining the metrics may include obtaining data from the computing device used to access the resource. The following are a few examples of how the metrics may be obtained.

For example, with each transmission from the user, the users IP address may be included as the sender of the message. Based on the IP address, the geographic location of the user may be identified. For example, the country in which the user is located may be identified. The IP address may also be used to obtain historical data about accesses. For example, the historical data may be the number of times that the user attempted access to the particular resource and whether the attempts were successful.

By way of another example, the obtained user metrics may include the number of other resources of the same type that the user has attempted access. For example, if the other resources of the same type are guarded by the same authentication engine, the authentication engine may determine the number of access attempts from the IP address to the other resources. As another example, the authentication engine may be part of a consortium of the resources of the same type that publishes IP addresses failed attempts to access to the other resources. In such a scenario, the authentication engine may determine the number of other resources in which authentication failed. By way of more concrete example, consider the scenario in which the resource is a financial institution. In such an example, the obtained IP address may be used to determine the number of times in which the user has attempted access to other financial institutions. By way of another example, the obtained IP address may be used to determine the number of times in which the user has attempted access to other accounts at the financial institutions.

Additionally or alternatively, the user metrics that are obtained may be based on the type of device artifacts and data in the device artifacts on the user's computing device. The user metrics may also include the day or the time of day of the access attempt. By way of an example, the authentication engine may gather the metrics from the data in the transmission from the sender and/or from a computing device on which the authentication engine executes.

In one or more embodiments of the invention, the authentication engine performs risk analysis to identify risk level based on user metrics (Step 311). The risk analysis may be based on one or more of the user metrics. For example, the number or percentage of cyber attacks instigated from the geographic region in which the user may be used to determine the risk level. In the example, the risk level is set higher when the IP address is from a geographic region identified as prone to instigating cyber attacks. The risk level is set as low when the IP address is from a geographic region identified in the user account. For example, if the user account is a financial institution account, when the IP address indicates that the user is attempting access from a geographic region of the account owner, the risk level may be set lower.

By way of another example, the risk level may be proportionally related to how late the time of day of the access is. For example, a higher risk level may be set when the access attempt is late at night than in the middle of the day.

By way of another example, if the computing device of the user has suspicious device artifacts, then the risk level may be set as high. Similarly, the risk level may be proportional to the number of failed attempts. In other words, the greater the number of failed attempts, the higher the risk will be.

In one or more embodiments of the invention, the risk analysis may include multiple metrics. In such embodiments, the combined risk level may be the maximum, the average, or another statistically combined value for the individual risk levels. For example, if the geographic location indicates that the user is in an area prone to instigate attacks (i.e., deemed high risk), but the historical data shows that the user has made several successful accesses from the IP address (i.e., deemed low risk), the risk level may still be set as high because of the geographic region or may be set as medium as the average of the two risk levels.

By way of another example, a correlation between the multiple metrics may be taken into account when performing the risk analysis. For example, the risk level may be determined based on the previously recorded user behavior for accessing the resource. Specifically, the risk level is proportionally related to a degree of similarity of the current access with the previously recorded user behavior. In the example, even if an authentication attempt is done late at night we may deem this low risk if the previously recorded user behavior of the user indicates that access occurs at this time.

In one or more embodiments of the invention, the authentication engine may perform a risk analysis each time the user attempts to gain access to the resource.

Based on the risk level, a determination is made whether the correct number of valid media objects is selected in one or more embodiments of the invention (Step 313). Specifically, the user is required to select a number of valid media objects to confirm the user's identity. The number may increase or decrease depending on the determined risk level. In other words, the higher risk constitutes an increase number of media objects required for authentication. If the invalid media objects are selected, the user is denied access to the resource (Step 315) and the user may be instructed to repeat Step 311. The user may be allowed only a set number of failed access attempts before the user account is locked or the user cannot access the account for a set period of time.

Alternatively, the user selects the correct number selected for the risk level (Step 313). Specifically, the user correctly selects all the valid media objects required to gain access to the resource, which are intermixed with invalid media objects. By selecting the correct number, the authentication engine authorizes the user to access the resource (Step 317).

Rather than or in addition to defining the number of valid media objects that must be selected to gain access to the resource, the risk level may denote the number of allowed attempts to access the resource.

Although FIG. 3 shows authentication only with the media objects, the authentication procedures in FIG. 3 may be combined with one or more other authentication methods. For example, the use of the media objects may be combined with username and password authentication. The additional methods that are used may be based, for example, on the risk analysis.

FIGS. 4A-4D show example user interfaces in one or more embodiments of the invention. The following example is for explanatory purposes only and not intended to limit the scope of the invention.

Figure 4A:
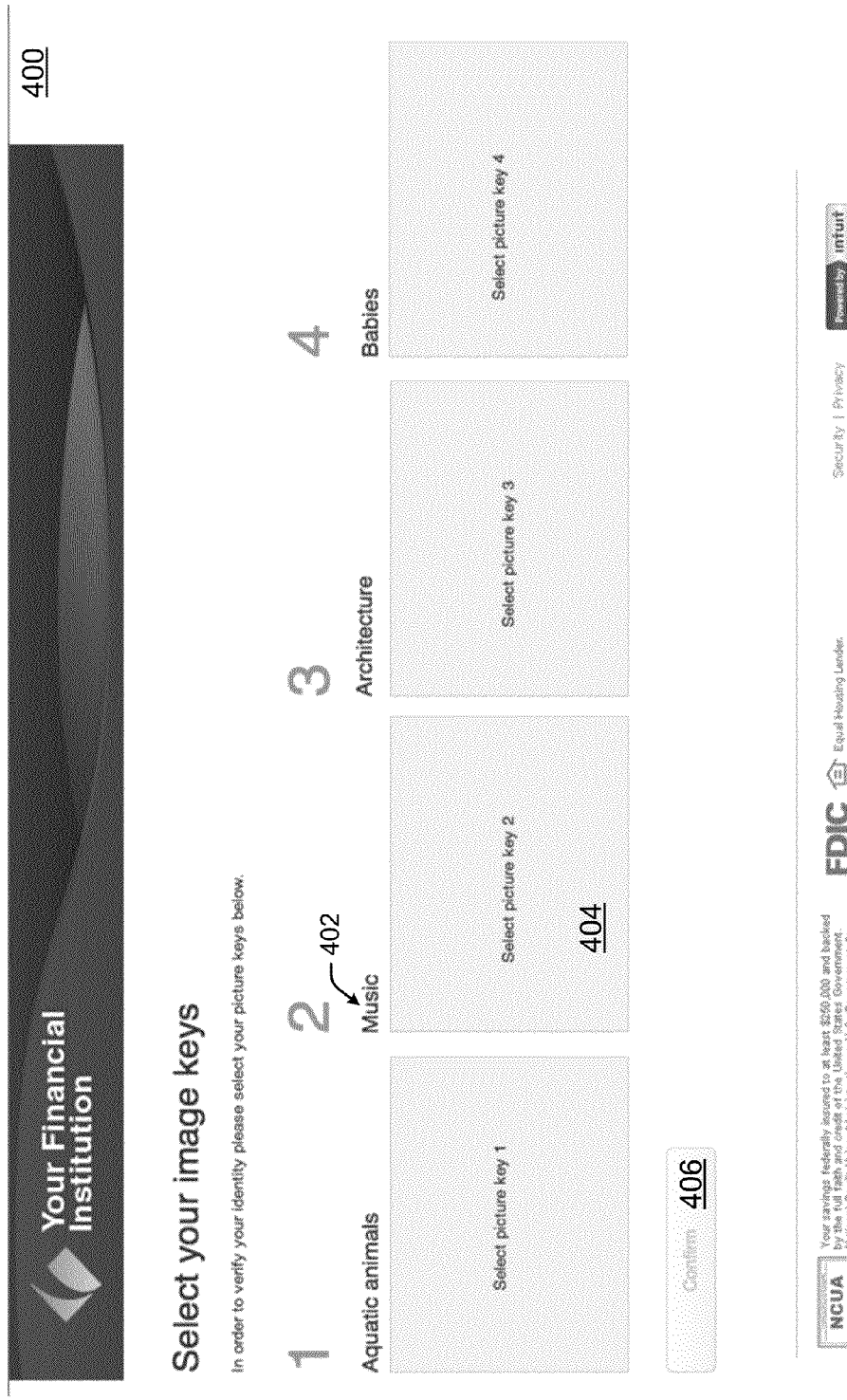
FIGS. 4A-4D show an example in one or more embodiments of the invention.

In the example, consider the scenario where a user is creating an account and selecting images for authentication. FIG. 4A shows an example of the user account creation user interface (400). As shown in FIG. 4A, the user interface (400) includes a category (402) and an image display (404) in one or more embodiments of the invention. When the user is ready, the user may select the category and the corresponding image(s). In the example, the user has selected four categories (i.e., aquatic animals, music, architecture, and babies).

Figure 4B:
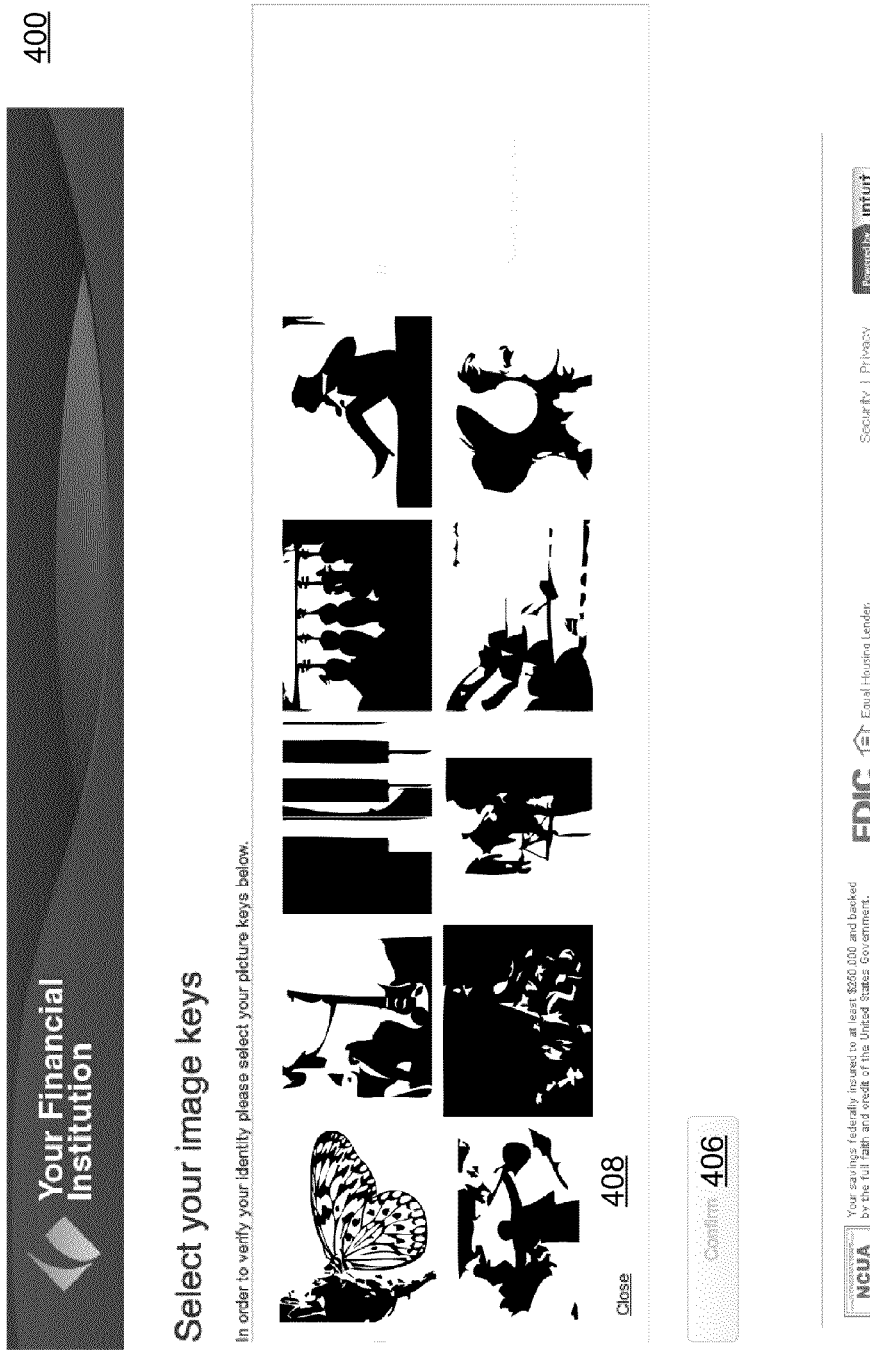

Continuing with the example, FIG. 4B shows a continued diagram of the account creation user interface (400) with the image display (404) expanded to present the different images for the music category in FIG. 4A. Thus, the user selects at least one image from the different images (408) presented. Next, the user confirms the selection by using the confirm button (406). In the scenario shown, the selected image would be considered the user's key to verify their identity after confirmation. Additionally, the different media objects (408) may be selected for the other categories presented. The selected images from the different categories may be used to verify the user's identity. Although not shown in FIG. 4B, the user may optionally request that additional stock images are presented in one or more embodiments of the invention. In other words, the user may not be limited to only those stock media objects that are initially presented to them.

Figure 4C:
Figure 4C:
Figure 4D:
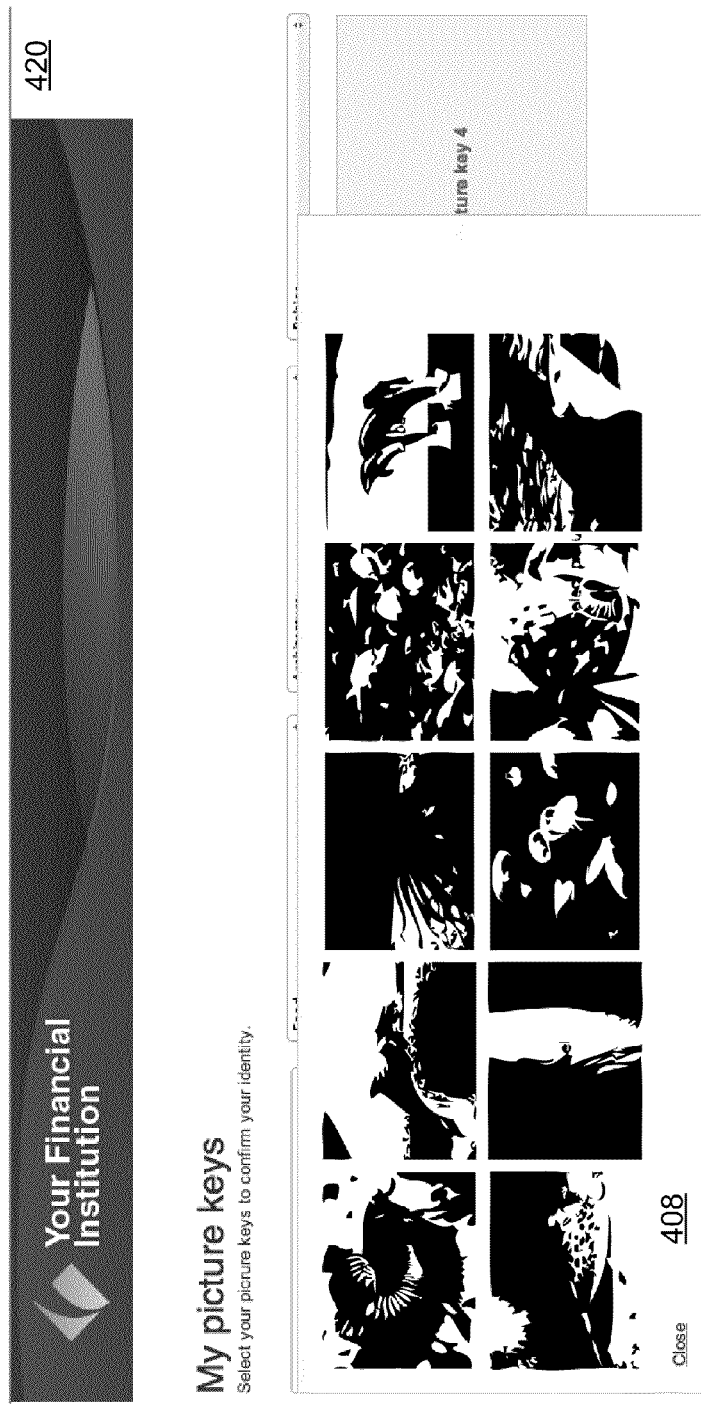

Continuing with the example, the user may attempt to access the account after the account is created. FIG. 4C shows an example of the user verification user interface (420) after the user has created an account. In FIG. 4C, the user selects the category from the category prompt (410). Accordingly, the user is given a selection of categories included in each category prompt associated with a media object display (404). After the user selects the category, the corresponding different media objects are presented (408) in FIG. 4D. As shown in FIG. 4D, the valid media object is combined with invalid media objects, which all relate to the category selected. Thus, the user selects at least one of the images.

Returning to FIG. 4C, the user selects the submit button (412) to accept the selection. In one or more embodiments of the invention, the user selects the submit button after each selection of an image. In one or more embodiments of the invention, the user selects the submit button only after all images are selected. In one or more embodiments, if the user selects invalid images or incorrect number of valid images at any point, then the verification system requires the user to abort or to retry gaining access to the resource. Alternatively, the system may wait until after the user has selected all images to obfuscate which selected images are valid and which are invalid. If the user selects the valid images or the correct number of valid images, then the verification system authorizes the user access to the resource.

In one or more embodiments of the invention, after the user has selected valid media objects, the user is granted access to the resource. Through the process of the user selecting media objects for the user authentication, the user's account is authorized without requiring the user to present textually any authentication.

Although the user selects the category during the setup and authentication procedures in the example, the category may be assigned to the user during the setup procedure. Alternatively or additionally, the user may not be required to provide the category during the authentication procedure. Rather, the previously selected or assigned category may be displayed for the user after the user enters their account identifier.

Figure 5:
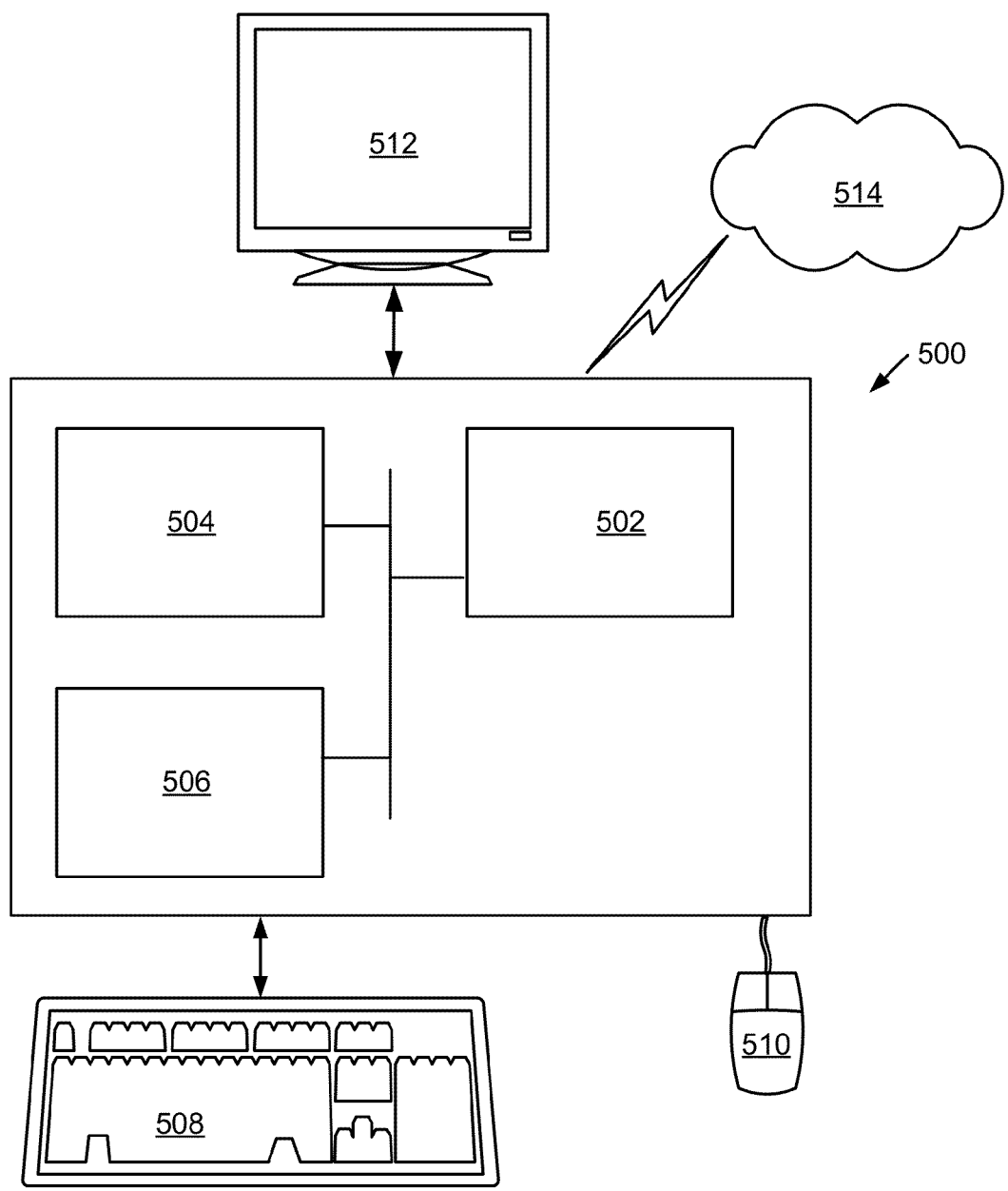
FIG. 5 shows a computer system in one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital versatile disk (DVD) drive, a flash memory stick, etc.), and numerous other elements and functionalities typical of today's computers (not shown). In one or more embodiments of the invention, the processor (502) is hardware. For example, the processor may be an integrated circuit. The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Many different types of computer systems exist, and the aforementioned input and output means may take other forms. Generally speaking, the computer system (500) includes at least the minimal processing, input, and/or output means necessary to practice embodiments of the invention.

Software instructions in the form of computer readable program code to perform embodiments of the invention may be stored, in whole or in part, temporarily or permanently, on a computer readable medium such as a compact disc (CD), a diskette, a tape, physical memory, or any other computer readable storage medium. Specifically, the software instructions may correspond to computer readable program code that when executed by a processor(s), is configured to perform embodiments of the invention. In one or more embodiments of the invention, the computer readable medium is a non-transitory computer readable medium.

Further, one or more elements of the aforementioned computer system (500) may be located at a remote location and connected to the other elements over a network. Further, embodiments of the invention may be implemented on a distributed system having a plurality of nodes, where each portion of the invention (e.g., data repository, resource, authentication engine, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for authenticating a user, comprising:
creating an account, wherein creating the account comprises:
presenting a category prompt to the user,
receiving a selection of a category from the user,
obtaining, from a media library, a plurality of stock media objects classified into the category, and
receiving, from the user, a selection of a valid media object from the plurality of stock media objects classified into the category, wherein the valid media object is one of the plurality of valid stock media objects;
receiving an account identifier from the user;
obtaining, based on the account identifier, a plurality of valid media objects;
presenting, to the user, a plurality of media objects comprising the plurality of valid media objects and a plurality of invalid media objects,
receiving, from the user, a selection of a subset of the plurality of media objects to obtain a selected subset;
obtaining user metrics for risk analysis;
performing, by a computer hardware processor of a device, risk analysis to identify a risk level for authentication based on user metrics, wherein the risk level defines a number of attempts that the user is permitted to select the plurality of valid media objects;
authenticating, after receiving the selection, the user when a selected number of valid media objects in the selected subset satisfies a minimum number specified by the risk level, wherein the selected subset comprises at least one valid media object and at least one invalid media object; and
authorizing the user to access a resource when the user is authenticated.

2. The method of claim 1, wherein, when presented, the plurality of media objects is arranged into a plurality of categories.

3. The method of claim 2, wherein for each category of the plurality of categories, presenting the plurality of media objects comprises:
presenting a valid media object of the plurality of media objects and classified into the category intermixed with a subset of the plurality invalid media objects classified into the category.

4. The method of claim 1, wherein the user metrics comprises an internet protocol address of the user, and wherein the risk level is set as high when the internet protocol address is from a geographic region identified as prone to instigating cyber attacks.

5. The method of claim 1, wherein the user metrics comprises an internet protocol address of the user, and wherein the risk level is set according to historical activities from the internet protocol address.

6. The method of claim 1, wherein the user metrics comprises a number of financial institutions that the user attempts to access, and wherein the risk level is proportionally related to the number of financial institutions.

7. The method of claim 1, wherein the user metrics comprises previously recorded user behavior for accessing the resource, and wherein the risk level is proportionally related to a degree of similarity with the previously recorded user behavior.

8. The method of claim 1, wherein the user metrics comprises types of device artifacts stored on a device of the user.

9. The method of claim 1, wherein the plurality of valid media objects are at least a part of authentication credentials for the user, and wherein the plurality of invalid media objects obfuscate which of the plurality of media objects are the plurality of valid media objects.

10. A system for authenticating a user, comprising:
a computer hardware processor;
a data repository for storing an account comprising a plurality of valid media object identifiers; and
an authentication engine connected to the data repository, executing on the computer hardware processor, and comprising:
a plurality of software instructions configured to:
create an account, wherein creating the account comprises:
presenting a category prompt to the user,
receiving a selection of a category from the user,
obtaining, from a media library, a plurality of stock media objects classified into the category, and
receiving, from the user, a selection of a valid media object from the plurality of stock media objects classified into the category, wherein the valid media object is one of the plurality of valid stock media objects;
obtain user metrics for risk analysis,
perform risk analysis to identify a risk level for authentication based on the user metrics, wherein the risk level defines a number of attempts that the user is permitted to select the plurality of valid media objects,
receive, from a user, an account identifier identifying the account,
obtain, based on the account identifier, a plurality of valid media objects identified by the plurality of valid media object identifiers,
present, to the user, a plurality of media objects comprising the plurality of valid media objects and a plurality of invalid media objects,
receive, from the user, a selection of a subset of the plurality of media objects to obtain a selected subset,
authenticate, after receiving the selection, the user when a selected number of valid media objects in the selected subset satisfies a minimum number specified by the risk level,
wherein the selected subset comprises at least one valid media object and at least one invalid media object, and
authorize the user to access a resource when the user is authenticated.

11. The system of claim 10, further comprising:
a category classifier application configured to classify the plurality of media objects into a plurality of categories.

12. The system of claim 10 further comprising:
a user interface configured to:
present the plurality of media objects, wherein the media objects are arranged into a plurality of categories.

13. The system of claim 12, wherein for each category of the plurality of categories, presenting the plurality of media objects comprises:
present a valid media object of the plurality of media objects and classified into the category intermixed with a subset of the plurality invalid media objects classified into the category.

14. The system of claim 10, wherein the plurality of software instructions is further configured to create the account for a user, wherein the user selects the plurality of media objects from a plurality of stock media objects corresponding to a plurality of categories while creating the account.

15. The system of claim 10, wherein the plurality of valid media objects are at least a part of authentication credentials for the user, and wherein the plurality of invalid media objects obfuscate which of the plurality of media objects are the plurality of valid media objects.

16. A non-transitory computer readable medium comprising computer readable program code for authenticating a user, the computer readable program code for:
creating an account, wherein creating the account comprises:
presenting a category prompt to the user,
receiving a selection of a category from the user,
obtaining, from a media library, a plurality of stock media objects classified into the category, and
receiving, from the user, a selection of a valid media object from the plurality of stock media objects classified into the category, wherein the valid media object is one of the plurality of valid stock media objects;
receiving an account identifier from the user;
obtaining, based on the account identifier, a plurality of valid media objects;
presenting, to the user, a plurality of media objects comprising the plurality of valid media objects and a plurality of invalid media objects,
receiving, from the user, a selection of a subset of the plurality of media objects to obtain a selected subset;
obtaining user metrics for risk analysis;
performing risk analysis to identify a risk level for authentication based on user metrics, wherein the risk level defines a number of attempts that the user is permitted to select the plurality of valid media objects;
authenticating, after receiving the selection, the user when a selected number of valid media objects in the selected subset satisfies a minimum number specified by the risk level,
wherein the selected subset comprises at least one valid media object and at least one invalid media object; and
authorizing the user to access a resource when the user is authenticated.

17. The non-transitory computer readable medium of claim 16, wherein, when presented, the plurality of media objects is arranged into a plurality of categories.

18. The non-transitory computer readable medium of claim 17, wherein for each category of the plurality of categories, presenting the plurality of media objects comprises:
presenting a valid media object of the plurality of media objects and classified into the category intermixed with a subset of the plurality invalid media objects classified into the category.

19. The non-transitory computer readable medium of claim 16, wherein the user metrics comprises an internet protocol address of the user, and wherein the risk level is set as high when the internet protocol address is from a geographic region identified as prone to instigating cyber attacks.

20. The non-transitory computer readable medium of claim 16, wherein the user metrics comprises an internet protocol address of the user, and wherein the risk level is set according to historical activities from the internet protocol address.

21. The non-transitory computer readable medium of claim 16, wherein the user metrics comprises a number of financial institutions that the user attempts to access, and wherein the risk level is proportionally related to the number of financial institutions.

22. The non-transitory computer readable medium of claim 16, wherein the user metrics comprises previously recorded user behavior for accessing the resource, and wherein the risk level is proportionally related to a degree of similarity with the previously recorded user behavior.

23. The non-transitory computer readable medium of claim 16, wherein the user metrics comprises types of device artifacts stored on a device of the user.

24. The non-transitory computer readable medium of claim 16, wherein the plurality of valid media objects are at least a part of authentication credentials for the user, and wherein the plurality of invalid media objects obfuscate which of the plurality of media objects are the plurality of valid media objects.

* * * * *